United States Patent

[11] 3,600,823

| [72] | Inventors | James A. R. Borron;<br>Roger E. F. Stevens, both of Mago Island, England |
|---|---|---|
| [21] | Appl. No. | 786,105 |
| [22] | Filed | Dec. 23, 1968 |
| [45] | Patented | Aug. 24, 1971 |
| [73] | Assignee | Mago Island Estate Limited<br>Mago Island, Lau, Fiji Islands |
| [32] | Priority | Dec. 29, 1967 |
| [33] | | Great Britain |
| [31] | | 59127/67 |

[54] DRYING AND-OR HEATING DEVICES
1 Claim, 1 Drawing Fig.

| [52] | U.S. Cl. | 34/232 |
|---|---|---|
| [51] | Int. Cl. | F26b 25/06 |
| [50] | Field of Search | 34/218, 224, 232, 233, 225 |

[56] References Cited
UNITED STATES PATENTS

| 2,951,294 | 9/1960 | Morch | 34/225 |
|---|---|---|---|
| 761,405 | 5/1904 | Rogers | 34/232 |
| 1,688,793 | 10/1928 | Schrenkeisen | 34/232 X |
| 2,343,345 | 3/1944 | Touton | 34/233 UX |
| 3,060,590 | 10/1962 | Brown | 34/233 X |

FOREIGN PATENTS

| 849,613 | 9/1960 | Great Britain | 34/233 |
|---|---|---|---|

*Primary Examiner*—Charles J. Myhre
*Attorney*—Norris & Bateman

ABSTRACT: Apparatus for drying and/or heating crops, the apparatus comprising heating means, means for passing air or other nontoxic gas over the heating means and along a duct, and vent means in said duct for directing the heated gas over a harvested crop which is to be dried and/or heated.

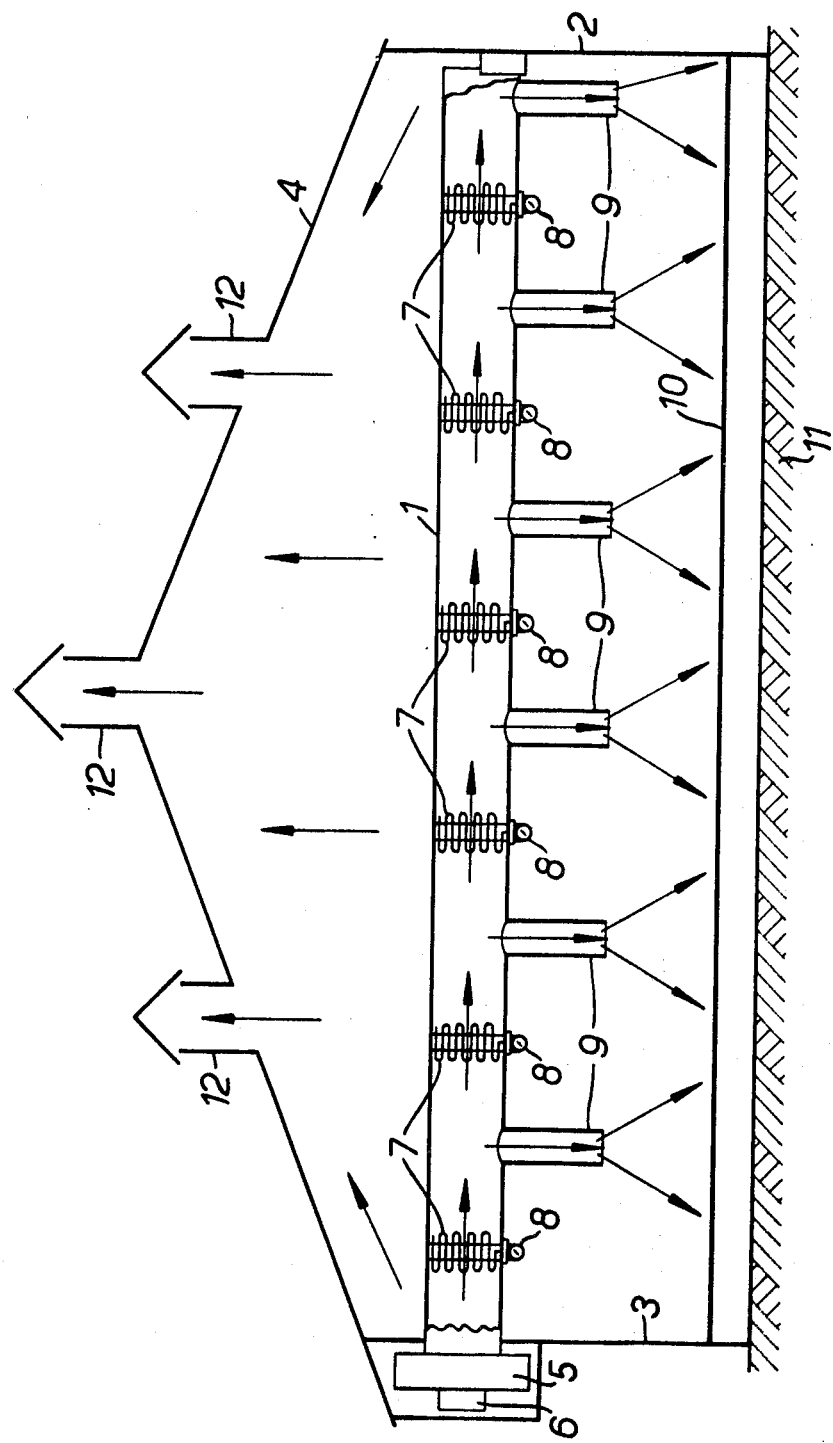

DRYING AND-OR HEATING DEVICES

This invention relates to apparatus for drying and/or heating crops.

According to the invention, there is provided apparatus for drying and/or heating crops, said apparatus comprising heating means, means for passing air or other nontoxic gas over the heating means and means for directing the heated gas over a harvested crop to be dried and/or heated, and means for expelling or allowing the escape of the gas after it has been passed over the substance.

Preferably the means for passing air or other nontoxic gas over said heating means includes a centrifugal fan which may be driven either directly or indirectly and encased so that an outlet from the fan can be connected to a duct which leads gas passing through the fan to the heating means. The heating means are preferably mounted in the duct and may comprise a number of electrically heated elements or grids which are thermostatically regulated. The elements or grids are desirably arranged at intervals along the duct and are spaced according to the gas temperatures required.

The invention will now be further described, by way of example, with reference to the accompanying drawing which is a diagrammatic representation of one embodiment of the drying and/or heating apparatus.

Referring to the drawing, the apparatus comprises a main duct 1 supported at each end by the walls 2, 3 of a building. A centrifugal fan is provided at one end of the duct 1 and is housed in a casing 5. The drive shaft 6 of the fan is connected to suitable drive means (not shown).

Spaced at intervals along the duct 1 are a number of electrically heated elements or grids 7 which are controlled by thermostats 8. A number of branch ducts 9 extend from the main duct 1 and serve to direct air or other nontoxic gas heated by the elements or grids 7 onto a mesh surface 10 supported by the walls 2, 3 above the floor 11 of the building. The mesh surface 10 is adapted to receive a harvested crop (not shown) to be dried and/or heated.

The roof 4 of the building is provided with a number of vents 12 to permit the escape of the air or other gas. Alternatively or in addition, positive air or other gas extraction means may be provided. In the drawing, the paths of the air or other gas taken from the fan to the vents in the roof are indicated by the arrows. If desired the building may be open at both ends to facilitate the escape of the heated gas after it has passed over or through the crop on the mesh surface 10.

Although a mesh surface is preferred, other means may be used to support a crop to be dried and/or heated. For example, the crop may be laid onto large trays which are fitted with wheels and arranged to run on rails. The rails extend outside the building so as to enable the trays to be rolled completely outside the building on dry days when the ambient temperature exceeds 90° F. so that the crop can be dried by the sun and hence reduce running costs of the apparatus according to the invention since the heating means can be shut off.

Although a device has been described having branch ducts leading from the main duct for directing air or other nontoxic gas onto the crop, it is envisaged to direct the gas by other means for example by providing slots in the main duct.

The thermostats 8 are responsive to the temperature of the heating elements 7. However, as an alternative or as an addition the thermostats may be provided which are responsive to the air temperature within the building to control the elements 7. These thermostats are not illustrated in the drawing but they may be located at suitable places within the building. Further, a sail switch may be provided which is controlled by air flow and which cuts off the power to the heating elements if the air flow should cease for any reason.

The device according to the invention has particular application to the drying of copra. In this case, air is used to dry the copra and the air is heated to between 60° and 800° F. and desirably between 80° and 110° F. depending on the humidity of the air. Such a device may be mounted in a building having open walls whereby after passing over the green copra the air can easily escape from the building.

It will be appreciated that although the device according to the invention is particularly useful for the drying of copra, the invention is not restricted in this respect and the device may be used for drying and/or heating other crops.

We claim:

1. Apparatus for drying and/or heating crops, comprising means defining a mesh surface for supporting a crop to be dried and/or heated, a main duct extending over said surface, a plurality of electrically heated elements mounted at spaced intervals in and along said duct, a centrifugal fan for passing a gas over said heating elements, and a plurality of downwardly directed branch ducts leading from said main duct for directing the heated gas from said main duct over said mesh surface, at least one of said heating elements being located in the main duct between each pair of successively adjacent branch ducts, and an individual thermostat associated with each of said heating elements for controlling each heating element individually.